United States Patent
Chouhan et al.

(10) Patent No.: US 10,301,945 B2
(45) Date of Patent: May 28, 2019

(54) INTERIOR COOLING CONFIGURATIONS IN TURBINE ROTOR BLADES

(71) Applicant: General Electric Company, Schenectady, NY (US)

(72) Inventors: Rohit Chouhan, Karnataka (IN); Randall Richard Good, Simpsonville, SC (US); Hiteshkumar Rameshchandra Mistry, Karnataka (IN); Shashwat Swami Jaiswal, Karnataka (IN)

(73) Assignee: General Electric Company, Schenectady, NY (US)

( * ) Notice: Subject to any disclaimer, the term of this patent is extended or adjusted under 35 U.S.C. 154(b) by 611 days.

(21) Appl. No.: 14/974,155

(22) Filed: Dec. 18, 2015

(65) Prior Publication Data

US 2017/0175535 A1    Jun. 22, 2017

(51) Int. Cl.
*F01D 5/18* (2006.01)
*F01D 5/20* (2006.01)
*F01D 5/22* (2006.01)

(52) U.S. Cl.
CPC .............. *F01D 5/18* (2013.01); *F01D 5/187* (2013.01); *F01D 5/20* (2013.01); *F01D 5/225* (2013.01);
(Continued)

(58) Field of Classification Search
CPC ... F01D 5/18; F01D 5/187; F01D 5/20; F01D 5/225; F01D 11/08; F01D 11/10; F01D 11/12; F05D 2240/307; Y02T 50/676
See application file for complete search history.

(56) References Cited

U.S. PATENT DOCUMENTS 4,576,551 A * 3/1986 Olivier .................... F01D 5/225
29/889.21
6,099,253 A    8/2000 Fukue et al.
(Continued)

FOREIGN PATENT DOCUMENTS

DE    19904229    * 10/2000
GB    1605335    *  8/1976

OTHER PUBLICATIONS

Machine translation of Luck DE19904229.*

*Primary Examiner* — Jason D Shanske
*Assistant Examiner* — Brian O Peters
(74) *Attorney, Agent, or Firm* — Mark E. Henderson; Ernest G. Cusick; Frank A. Landgraff

(57) ABSTRACT

A turbine rotor blade that includes: an airfoil defined between a pressure face and a suction face; a tip shroud that includes a seal rail projecting from an outboard surface and, formed thereon, a cutter tooth; and a cooling configuration that includes a cooling channel for receiving and directing a coolant through an interior of the rotor blade. The cooling channel may include fluidly connected segments, in which: a supply segment extends radially through the airfoil; a cutter tooth segment is formed within the cutter tooth of the seal rail; and branching segments formed within at least one of the tip shroud and an outboard region of the airfoil. Each of the branching segments may extend between an upstream port, which connects to the cutter tooth segment, and an outlet port, which is formed on a target surface area, so that the branching segment bisects a target interior region.

13 Claims, 11 Drawing Sheets

(52) U.S. Cl.
CPC .... *F05D 2220/32* (2013.01); *F05D 2240/307* (2013.01); *F05D 2240/55* (2013.01); *F05D 2260/20* (2013.01); *F05D 2260/202* (2013.01); *Y02T 50/671* (2013.01); *Y02T 50/673* (2013.01); *Y02T 50/676* (2013.01)

(56) References Cited

U.S. PATENT DOCUMENTS

| | | | |
|---|---|---|---|
| 6,152,695 A | 11/2000 | Fukue et al. | |
| 6,179,556 B1* | 1/2001 | Bunker | F01D 5/187 415/115 |
| 2005/0036890 A1* | 2/2005 | Tomberg | F01D 5/147 416/192 |
| 2010/0290897 A1* | 11/2010 | Beeck | F01D 5/225 415/173.1 |
| 2013/0058788 A1* | 3/2013 | Brandl | F01D 5/187 416/95 |
| 2013/0094944 A1* | 4/2013 | Lacy | F01D 5/225 415/173.1 |

\* cited by examiner

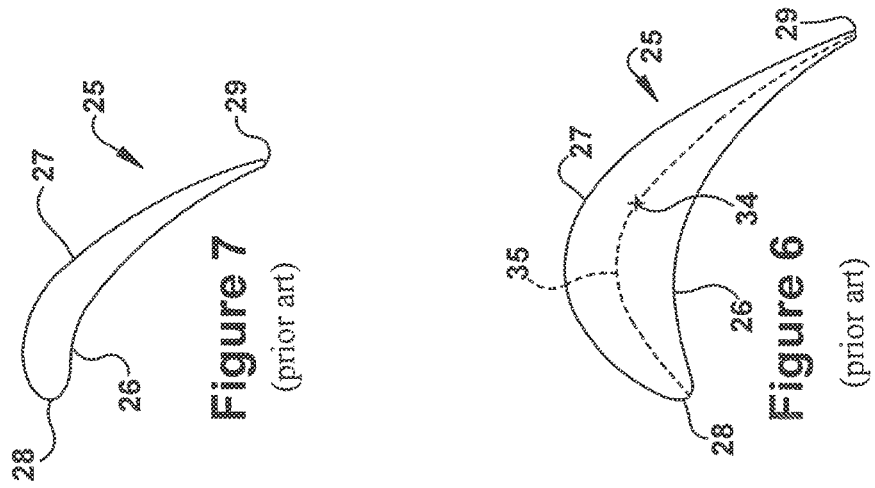
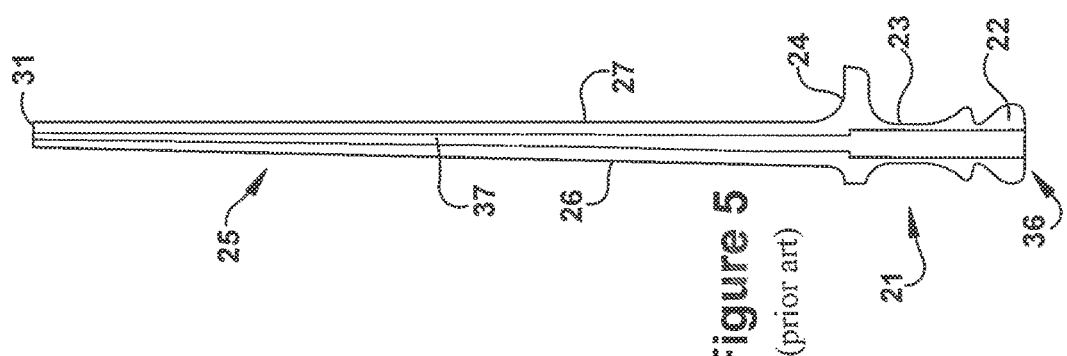
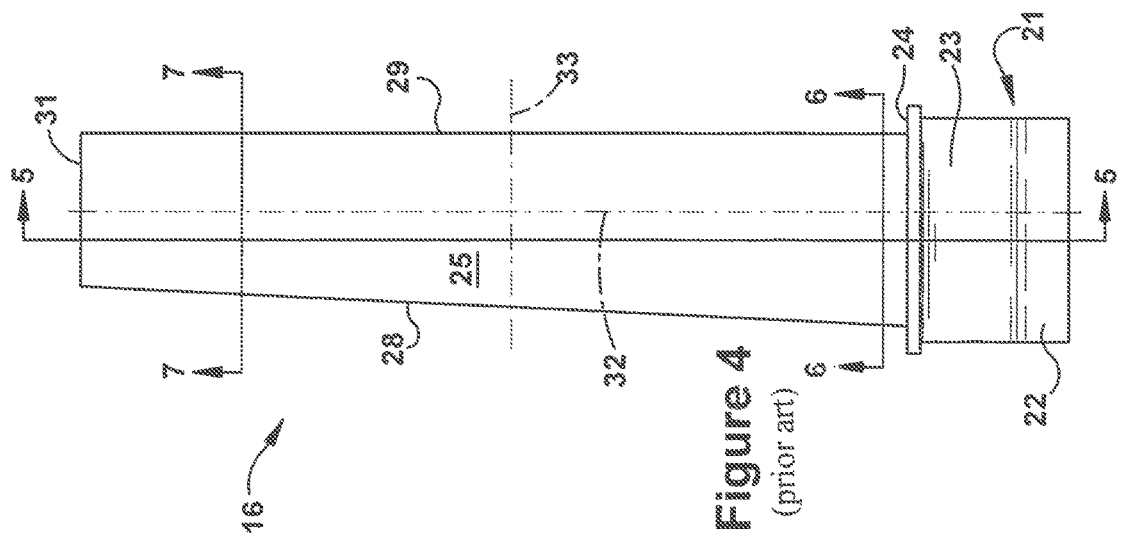

INTERIOR COOLING CONFIGURATIONS IN TURBINE ROTOR BLADES

BACKGROUND OF THE INVENTION

This present application relates to interior cooling channels and configurations of the blades in gas turbine engines. More specifically, but not by way of limitation, the present application relates to interior cooling channels and structural configurations formed near the outer radial tip of turbine rotor blades.

It will be appreciated that combustion or gas turbine engines ("gas turbines") include compressor and turbine sections in which rows of blades are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in a combustor to combust a supply of fuel. The resulting flow of hot expanding gases from the combustion, i.e., the working fluid, is expanded through the turbine section of the engine. The flow of working fluid through the turbine is redirected by the stator blades onto the rotor blades so to induce rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, the blades within the turbine become highly stressed with extreme mechanical and thermal loads.

The engineering of efficient and cost-effective gas turbines is an ongoing and significant objective. While several strategies for increasing the efficiency of gas turbines are known, it remains a challenging objective because such alternatives—which, for example, include increasing the size of the engine, increasing the temperatures through the hot-gas path, and increasing the rotational velocities of the rotor blades—generally place additional strain on blades and other hot-gas path components parts that are already highly stressed. As a result, improved apparatus, methods or systems that reduce operational stresses placed on turbine blades or allow the turbine blades to better withstand these stresses so that the engines may operate more efficiently remain a significant area for technological improvement.

One strategy for alleviating the stresses on the blades is through actively cooling them during operation. Such cooling may allow the blades to better withstand higher firing temperatures and mechanical stresses, which may extend the life of the blades and generally make the engine more cost-effective and efficient to operate. One way to cool blades during operation is through the use of internal cooling channels or circuits. Generally, this involves passing a relatively cool supply of compressed air derived from the compressor through internal cooling channels. For a number of reasons, as will be appreciated, great care is required in designing and manufacturing these interior cooling channels.

First, the use of cooling air decreases the efficiency of the engine. Specifically, air from the compressor that is diverted for cooling purposes is air that otherwise could be used in the combustion process. As a result, the usage of such air necessarily decreases the air available for combustion and, thereby, decreases overall efficiency. This mandates that cooling channels be highly efficient so that air usage for cooling is minimized. Second, newer turbine blade design calls for aggressively shaped, aerodynamic configurations, which are thinner and more curved or twisted. These new blade configurations place a further premium on compact and efficient channels. These new designs also create spatial constraints that hinder or constrain the manufacture of traditional cooling channel configurations using conventional approaches. Third, interior cooling channels must be configured to promote light-weight rotor blades while still providing robust enough structure for withstanding extreme loading. That is to say, while cooling channel design is an effective way to reduce the overall weight of the blade—which promotes efficiency and reduces mechanical loads—the blades must still remain very resilient. Cooling channels, therefore, must be designed to both remove material and weight while still promoting structural resilience. Internal arrangements must also avoid stress concentrations or inadequately cooled regions (or "hot spots") that may negatively impact part-life. Fourth, cooling configurations must also be designed so that discharged coolant promotes surface cooling and efficient, aerodynamic operation. Specifically, because cooling channels typically discharged coolant into the working fluid flowpath after circulating through the internal cooling channels, another design consideration concerns the use of discharged coolant for surface cooling as well as minimizing the aerodynamic loses associated therewith. The ejected coolant is often counted on to provide cooling to outer surfaces or regions of the blade after its release, and this must both dovetail with internal cooling strategies and take into account aerodynamic performance.

As will be appreciated, according to these and other criteria, the design of internal cooling configurations within turbine blades includes many complex, often competing considerations. Novel designs that balance these in a manner that optimizes or enhances one or more desired performance criteria—while still adequately promoting structural robustness, part-life longevity, cost-effective engine operation, and the efficient usage of coolant—represent significant technological advances.

BRIEF DESCRIPTION OF THE INVENTION

The present application thus describes a turbine rotor blade that may include: an airfoil defined between a concave pressure face and a laterally opposed convex suction face; a tip shroud connected to an outboard tip of the airfoil that includes a seal rail projecting from an outboard surface and, formed on the seal rail, a cutter tooth; and a cooling configuration that includes a cooling channel for receiving and directing a coolant through an interior of the rotor blade. The cooling channel may include fluidly connected segments, in which: a supply segment extends radially through the airfoil; a cutter tooth segment is formed within the cutter tooth of the seal rail; and branching segments formed within at least one of the tip shroud and an outboard region of the airfoil. Each of the branching segments may extend between an upstream port, which connects to the cutter tooth segment, and an outlet port, which is formed on a target surface area, so that the branching segment bisects a target interior region.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which:

FIG. 4 is a side view of an exemplary turbine rotor blade that may include an internal cooling configuration and structural arrangement according to aspects and embodiments of the present application;

FIG. 5 is a section view along sight line 5-5 of FIG. 4;

FIG. 6 is a section view along sight line 6-6 of FIG. 4;

FIG. 7 is a section view along sight line 7-7 of FIG. 4;

DETAILED DESCRIPTION OF THE INVENTION

Figure 1:
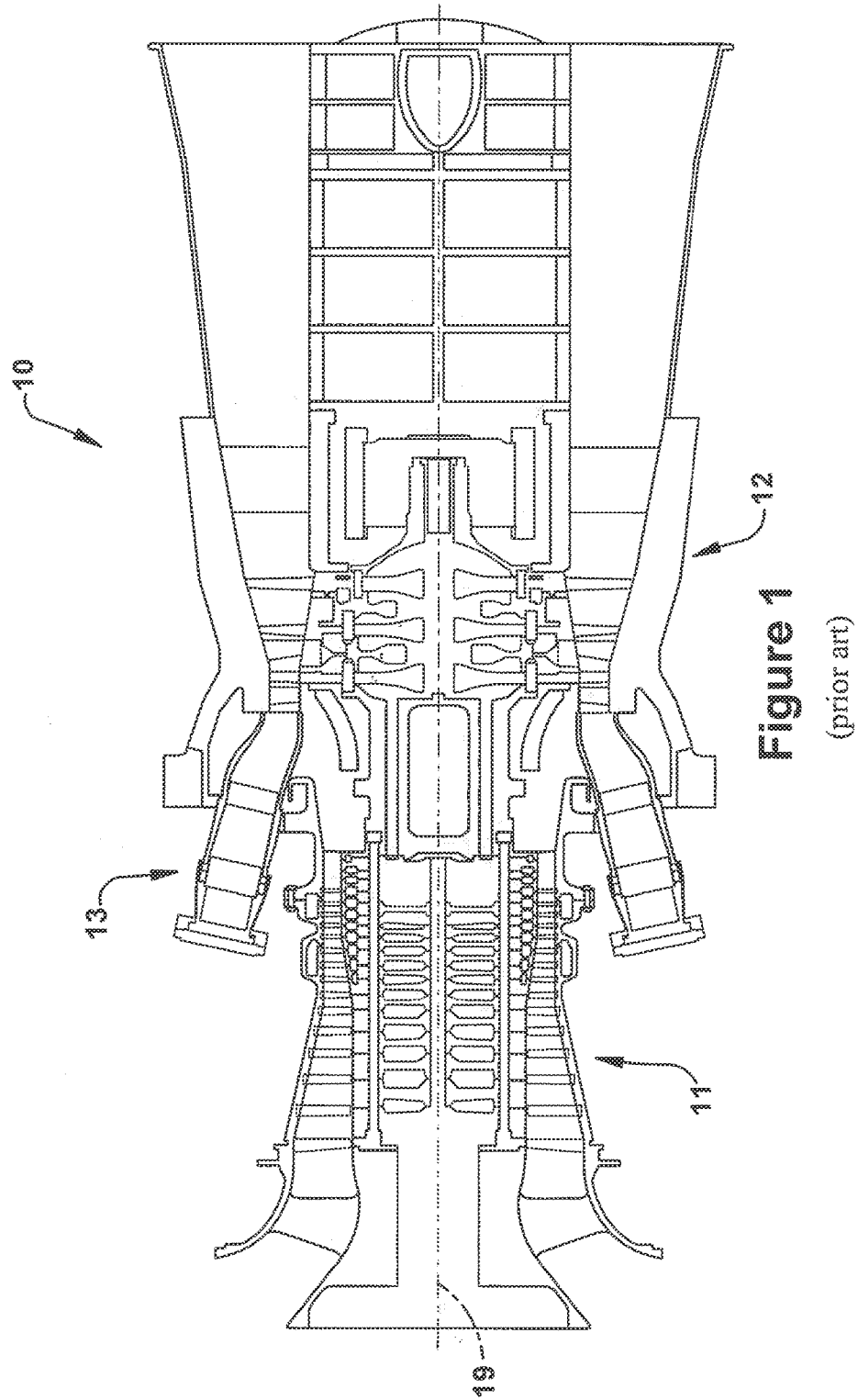
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. These terms and their definitions, unless specifically stated otherwise, are as follows. As will be understood, such terms may be used both in describing or claiming the gas turbine or one of its primary subsystems—i.e., the compressor, combustor, or turbine—as well as to describe or claim components or subcomponents for usage therewithin. In the latter case, the terminology should be understood as describing those components as they would be upon proper installation and/or function within the gas turbine engine or primary subsystem.

Accordingly, the terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face oriented in the forward direction as defined by the orientation of the gas turbine (i.e., the positioning of the combustor and turbine subsystems). Unless otherwise stated, this assumption holds for the following descriptive terms as well.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as relating to what would be understood by one skilled in the art as the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized or generalized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Accordingly, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
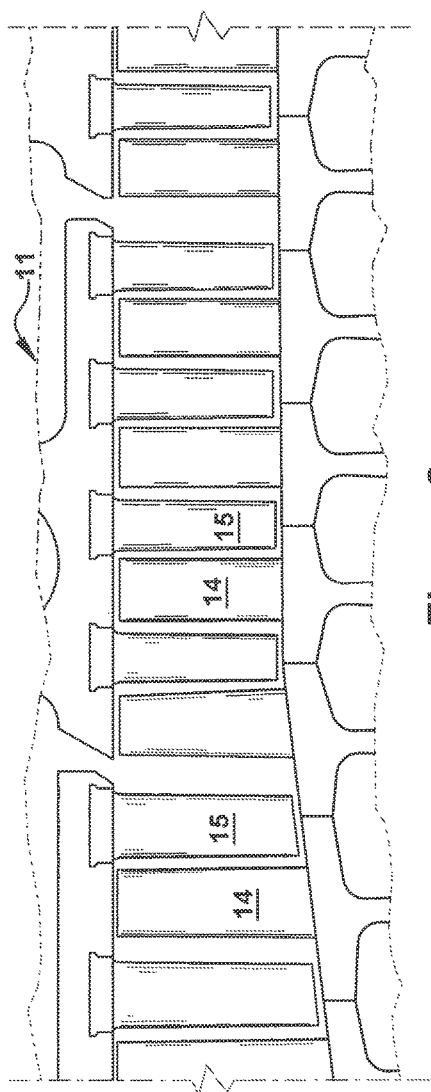
FIG. 2 is a sectional view of the compressor section of the gas turbine of FIG. 1.
Figure 3:
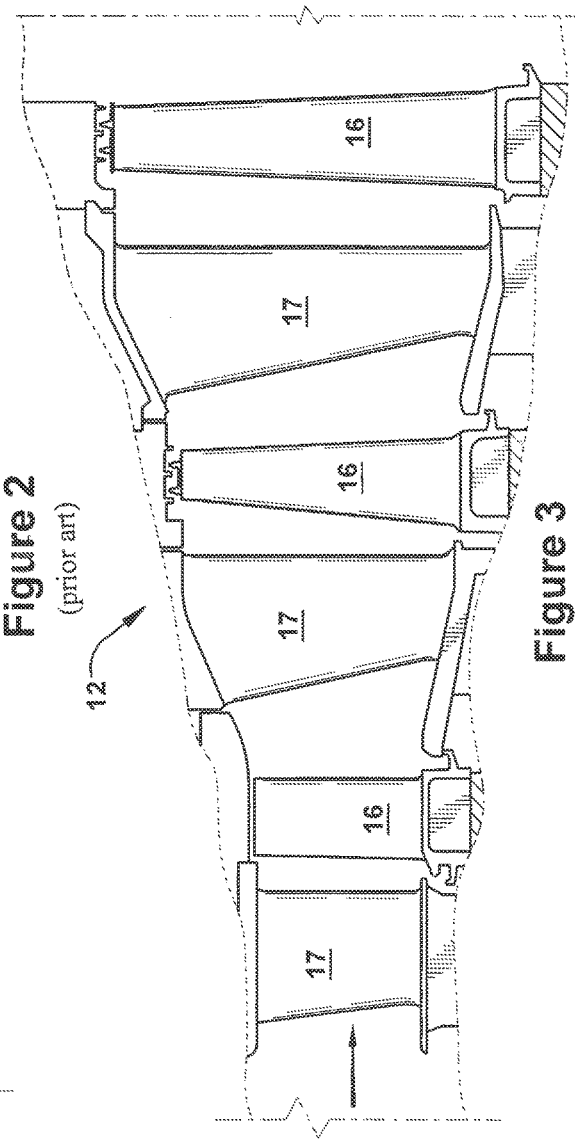
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

For background purposes, FIGS. 4 through 7 provide views of a turbine rotor blade 16 in accordance with or within which aspects of the present invention may be practiced. As will be appreciated, these figures are provided to illustrate common configurations of rotor blades and delineate spatial relationships between components and regions within such blades for later reference, while also describing geometric constraints and other criteria that affect the internal and external design thereof. While the blade of this example is a rotor blade, it will be appreciated that, unless otherwise stated, the present invention also may be applied to other types of blades within the gas turbine. As stated above, description of such components may include terminology that derives meaning based on the orientation and function of the gas turbine engine and, more specifically, the working fluid flowpath, and, thus, should be understood in that context, i.e., that such description assumes the rotor blade is properly installed and operating under anticipated or normal conditions within the engine.

The rotor blade 16, as illustrated, may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, which is the active component of the rotor blade 16 that intercepts the flow of working fluid through the turbine 12 and induces the desired rotation. The platform 24 may define the inboard end of the airfoil 25. The platform also may define a section of the inboard boundary of the working fluid flowpath through the turbine 12.

The airfoil 25 of the rotor blade may typically include a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip 31. The airfoil 25 may include a curved or contoured shape that that is designed for promoting desired aerodynamic performance. As illustrated in FIGS. 4 and 5, the shape of the airfoil 25 may taper gradually as it extends between the platform 24 and the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction face 26 and the pressure face 27, as illustrated in FIG. 5. As shown in FIGS. 6 and 7, the contoured shape of the airfoil 25 may further include a twisting about the longitudinal axis of the airfoil 25 as it extends from the platform 24. As will be appreciated, the twisting may be included so to vary a stagger angle for the airfoil 25 gradually between the inboard end and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including two radially stacked sections defined inboard and outboard of a radial midline 33 of the airfoil 25. Thus, as used herein, an inboard section or half of the airfoil 25 extends between the platform 24 and the radial midline 33, while an outboard section or half extends between the radial midline 33 and the outboard tip 31. Finally, the airfoil 25 may be described as including a pressure face section or half and a suction face section or half, which, as will be appreciated are defined to each side of the camber line 35 of the airfoil 25 and the corresponding face 26, 27 of the airfoil 25.

The rotor blade 16 may further include an internal cooling configuration 36 having one or more cooling channels 37 through which a coolant is circulated during operation. Such cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
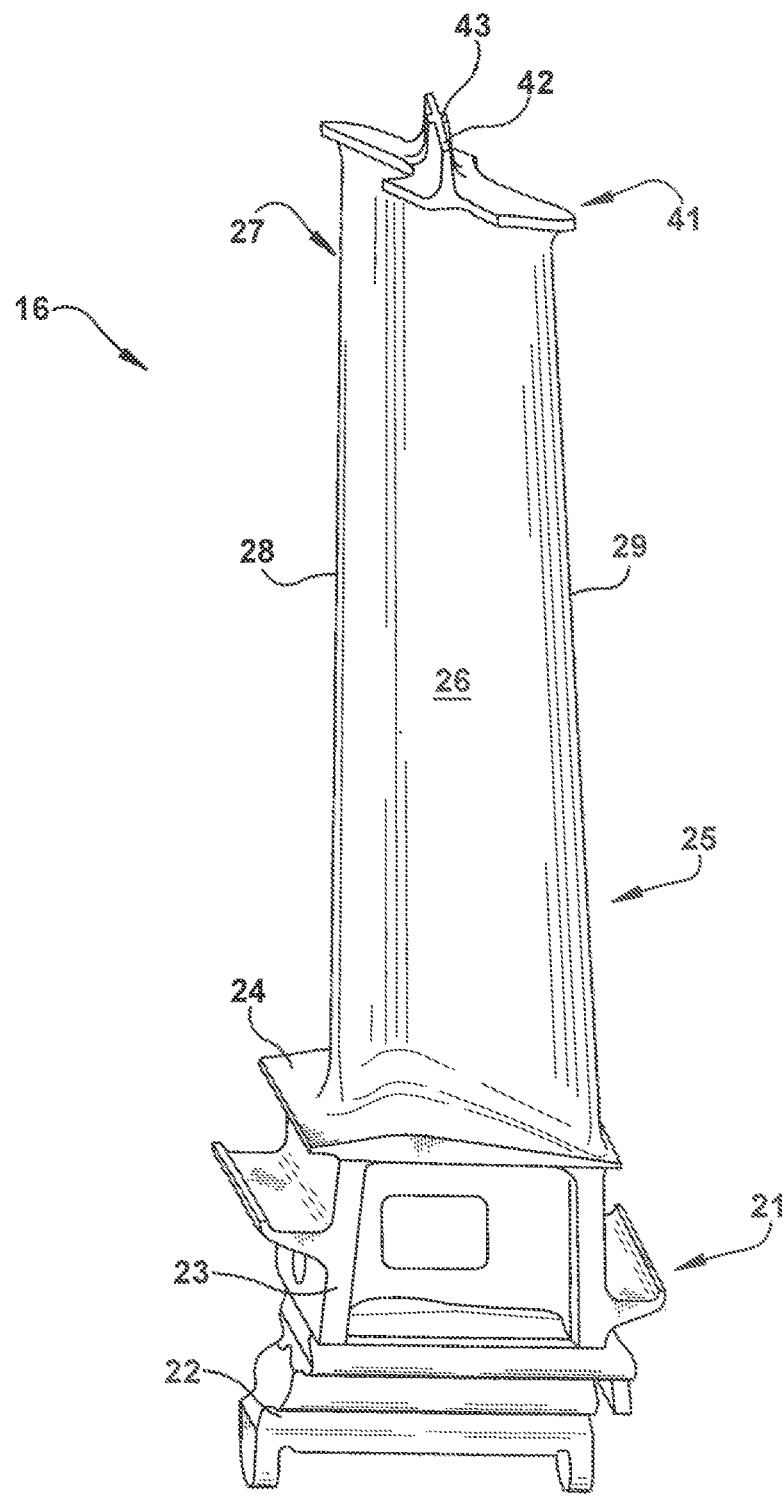
FIG. 8 is a perspective view of an exemplary turbine rotor blade that may include a tip shroud and configuration according to aspects and embodiments of the present application.
Figure 9:
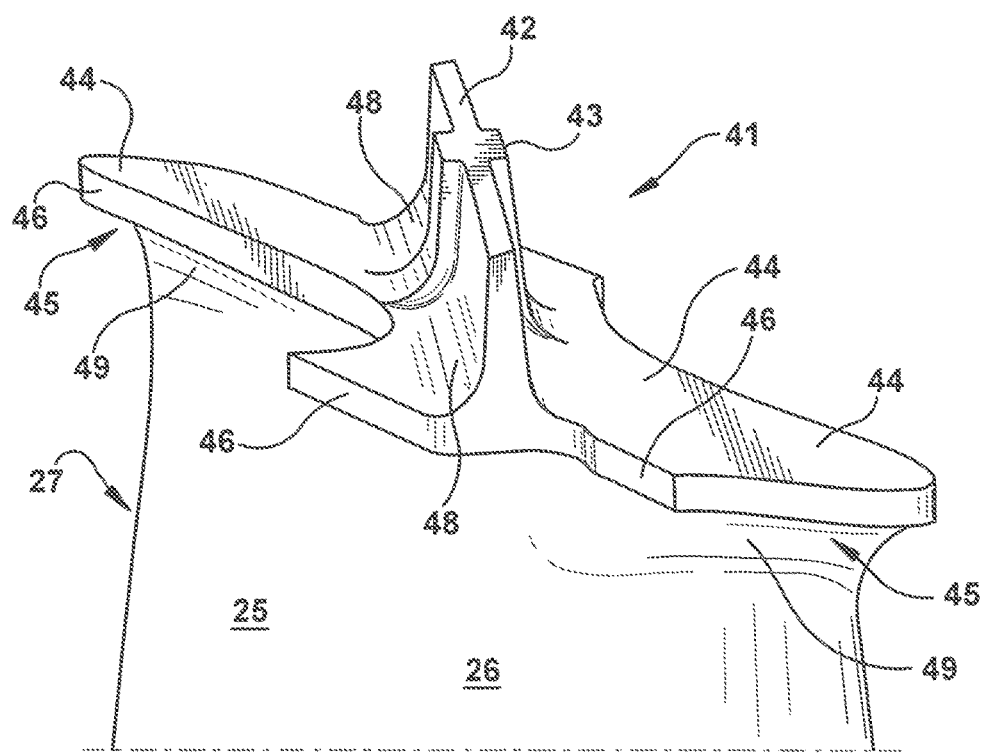
FIG. 9 is an enhanced perspective view of the tip shroud of FIG. 8.
Figure 10:
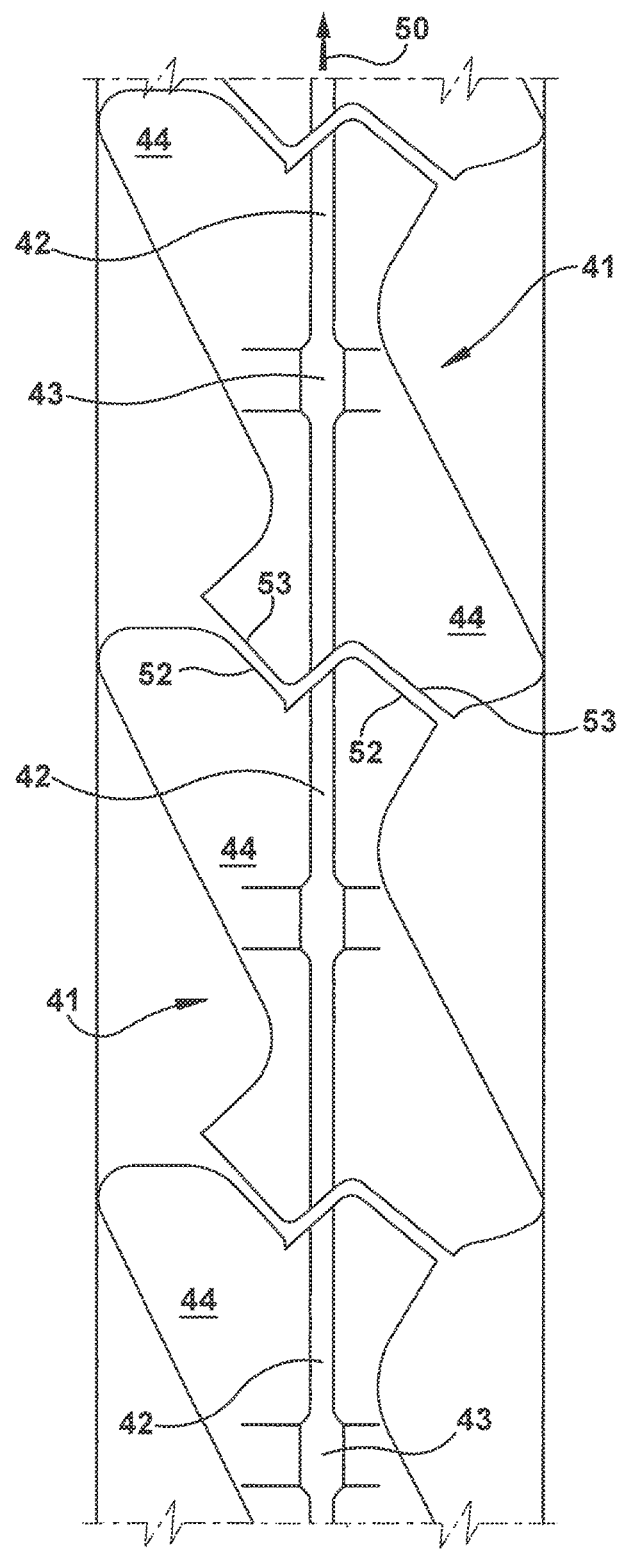
FIG. 10 is an outboard perspective of an installed arrangement of turbine rotor blades that may include tip shrouds and configurations according to aspects and embodiments of the present application.
Figure 11:
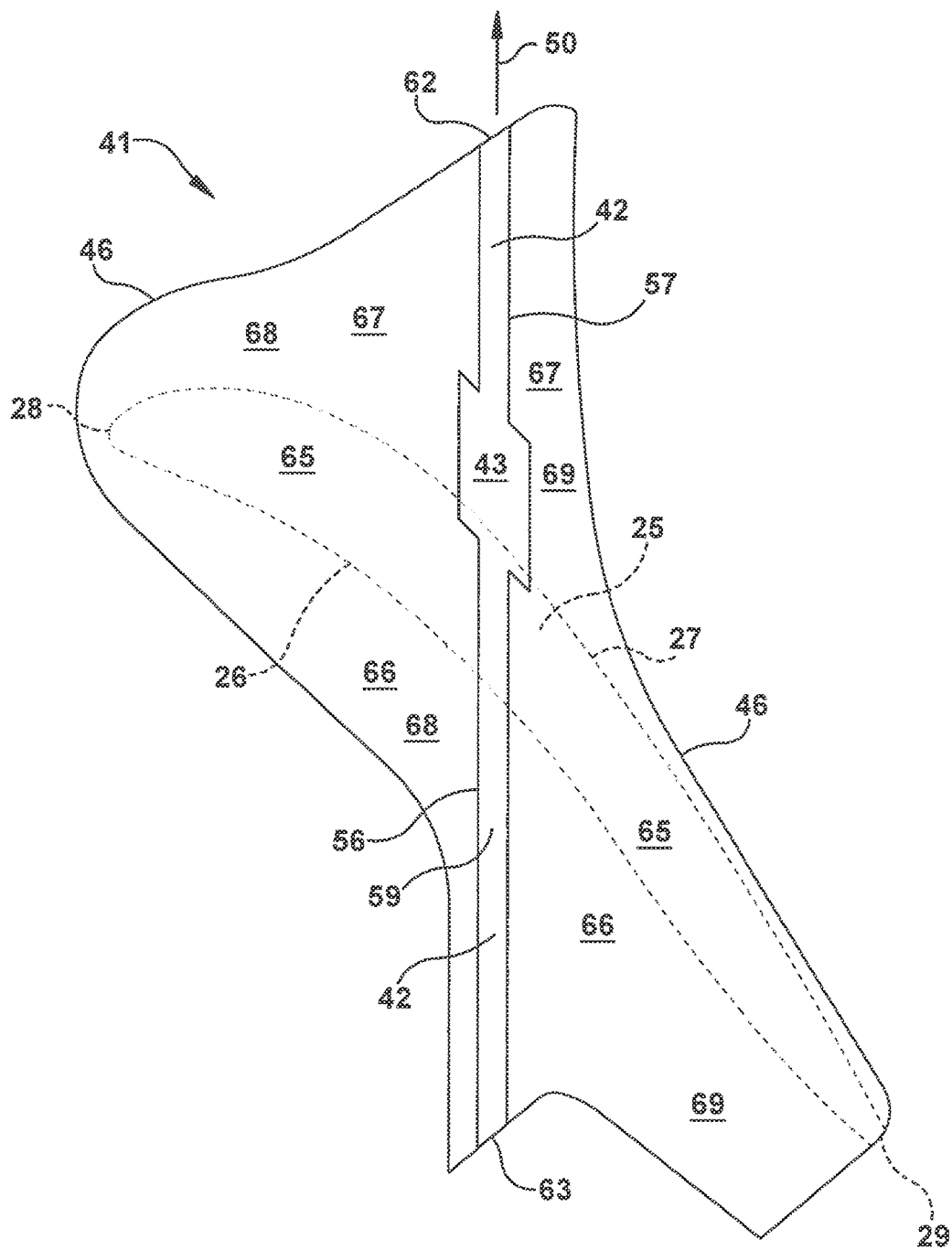
FIG. 11 is an outboard perspective of a tip shroud that may include a configuration according to aspects and embodiments of the present application.

FIGS. 8 through 11 illustrate a turbine rotor blade 16 having a tip shroud 41 in accordance with the present invention or within which the present invention may be used. As will be appreciated, FIG. 8 is a perspective view of an exemplary turbine rotor blade 16 that includes a tip shroud 41, while FIG. 9 is an enhanced view of the tip shroud 41 portion. FIG. 10 provides a profile from an outboard perspective of an exemplary installed arrangement of tip shrouded rotor blades 16. Finally, FIG. 11 provides an enlarged outboard profile view of a tip shroud 41 that may be used to delineate the different regions within tip shrouds in the discussion to follow.

As shown, the tip shroud 41 may be positioned near or at the outboard end of the airfoil 25. The tip shroud 41 may include an axially and circumferentially extending flat plate or planar component, which is supported towards its center by the airfoil 25. For descriptive purposes, the tip shroud 41 may include an inboard surface 45, outboard surface 44, and edge 46. As illustrated, the inboard surface 45 opposes the outboard surface 44 across the narrow radial thickness of the tip shroud 41, while the edge 46 connects the inboard surface 45 to the outboard surface 44 and, as used herein, defines a peripheral or outboard profile of the tip shroud 41.

A seal rail 42 may be positioned along the outboard surface 44 of the tip shroud 41. Generally, as illustrated, the seal rail 42 is a fin-like projection that extends radially outward from the outboard surface 44 of the tip shroud 41. The seal rail 42 may extend circumferentially between opposite ends of the tip shroud 41 in the direction of rotation or "rotation direction" of the rotor blade 16. As will be appreciated, the seal rail 42 may be used to deter leakage of working fluid through the radial gap that typically exists between the tip shroud 41 and the surrounding stationary components, which define the outboard boundary of the working fluid flowpath through the turbine. According to conventional designs, the seal rail 42 may extend radially into an abradable stationary honeycomb shroud that opposes it across that gap. The seal rail 42 may extend across substantially the entire circumferential length of the outboard surface 44 of the tip shroud 41. As used herein, the circumferential length of the tip shroud 41 is the length of the tip shroud 41 in the rotation direction 50. For descriptive purposes, the seal rail 42 may include opposing rail faces, in which a forward face 56 corresponds to the forward direction of the gas turbine, and an aftward face 57 corresponds with the aftward direction. As will be appreciated, the forward face 56 thus faces toward or into the flow direction of working fluid, while the aftward face 57 faces away from it. Each of the forward face 56 and aftward face 57 of the seal rail 42 may be arranged so to form a steep angle relative to the outboard surface 44 of the tip shroud 41.

Though other configurations are possible, the seal rail 42 may have an approximately rectangular profile. The forward face 56 and the aftward face 57 of the seal rail 42 may connect along circumferentially narrow edges, which, as used herein, include: opposing and approximately parallel outboard and inboard edges, and opposing and approximately parallel rotationally leading and rotationally trailing edges. Specifically, the inboard edge of the seal rail 42 may be defined at the interface between the seal rail 42 and the outboard surface 44 of the tip shroud 41. As will be appreciated, the inboard edge is somewhat obscured given the fillet regions that are formed for structural purposes between the seal rail 42 and the tip shroud 41, and thus is not specifically referenced by a numeral identifier. The outboard edge 59 of the seal rail 42 is radially offset from the outboard surface 44 of the tip shroud 41. This radial offset, as will be appreciated, generally represents the radial height of the seal rail 42. As indicated, a rotationally leading edge 62 of the seal rail 42 juts radially from the edge 46 of the tip shroud 41 that overhangs the suction face 27 of the airfoil 25. Because of this, the rotationally leading edge 62 is the component that "leads" the seal rail 42 as the rotor blade 16 rotates during operation. At the opposite end of the seal rail 42, a rotationally trailing edge 63 juts radially from the edge 46 of the tip shroud 41 that overhangs the pressure face 26 of the airfoil 25. Given this arrangement, the rotationally trailing edge 63 is the component that "trails" the seal rail 42 as the rotor blade 16 rotates during operation.

A cutter tooth 43 may be disposed on the seal rail 42. As will be appreciated, the cutter tooth 43 may be provided for cutting a groove in the abradable coating or honeycomb of the stationary shroud that is slightly wider than the width of the seal rail 42. As will be appreciated, the honeycomb may be provided to enhance seal stability, and the use of the cutter tooth 43 may reduce spillover and rubbing between stationary and rotating parts by clearing this wider path. The cutter tooth 43 generally is an area of increased width along the circumferential length of the seal rail 42. More particularly, the cutter tooth 43 may include a circumferential section of the seal rail 42 that is axially widened. This axial widened region may extend radially between the outboard surface 44 of the tip shroud 41 and the outboard edge of the seal rail 42. The cutter tooth 43 may be positioned near the center or middle region of the seal rail 42. As provided below, the cutter tooth 43 may be disposed within the airfoil portion of the outboard surface 44 of the tip shroud 41. The cutter tooth 43 may have an approximate rectangular profile, though other profiles are also possible.

The tip shroud 41 may include fillet regions 48, 49 that are configured to provide smooth surficial transitions between the divergent surfaces of the tip shroud 41 and the airfoil 25, as well as those between the tip shroud 41 and the seal rail 42. As such, configurations of the tip shroud 41 may include an outboard fillet region 48 that is formed between the outboard surface 44 of the tip shroud 41 and the forward face 56 and aftward face 57 of the seal rail 42. The tip shroud 41 may further include an inboard fillet region 49 that is formed between the inboard surface 45 of the tip shroud 41 and the pressure and suction faces 26, 27 of the airfoil 25. As will be appreciated, the inboard fillet region 49 may be more particularly described as including: a pressure inboard fillet region, which is the portion formed between the pressure face 26 of the airfoil 25 and the inboard surface 45 of the tip shroud 41; and a suction inboard fillet region, which is the portion formed between the suction face 26 of the airfoil 25 and the inboard surface 45 of the tip shroud 41. The outboard fillet region 48 may be more particularly described as including: a forward outboard fillet region, which is the portion formed between the forward face 56 of the seal rail 42 and the outboard surface 44 of the tip shroud 41; and an aftward outboard fillet region, which is the portion formed between the aftward face 57 of the seal rail 42 and the outboard surface 44 of the tip shroud 41. As depicted, each of these fillet regions 49, 48 may be configured to provide smoothly curving transitions between the several planar surfaces that form abrupt or steeply angle transitions. As will be appreciated, such fillet regions may improve aerodynamic performance as well as spread stress concentrations that would otherwise occur in those areas. Even so, these areas remain highly stressed due to the overhanging or cantilevered load of the tip shroud 41 and the rotational speed of the engine. As will be appreciated, without adequate cooling, the stresses in these areas are a significant limit on the useful life of the component.

With particular reference now to FIG. 10, tip shrouds 41 may be configured to include a contact interface in which contact surfaces or edges engage like surfaces or edges formed on the tip shrouds 41 of neighboring rotor blades during operation. As will be appreciated, this may be done, for example, to reduce leakage or harmful vibration. FIG. 10 provides an outboard view of tip shrouds 41 on turbine rotor blades as they might appear in an assembled condition. As indicated, relative to the rotation direction 50, the edge 46 of the tip shroud 41, for descriptive purposes, may include a rotationally leading contact edge 52 and a rotationally trailing contact edge 53. Thus, as shown, the tip shroud 41 in a rotationally leading position may be configured with a rotationally trailing contact edge 53 that contacts or comes in close proximity to the rotationally leading contact edge 52 of the tip shroud 41 in a rotationally trailing position relative to it. While this area of contact between the neighboring tips shrouds 41 may be generally referred to as a contact interface, given the profile of the exemplary configuration, it also may be referred to as a "Z-notch" interface. Other configurations are also possible. In forming the contact interface, the edge 46 of the tip shroud 41 may be configured with a notched section that is intended to cooperatively contact or engage a neighboring and samely-configured tip shroud 41 in a predetermined manner.

With particular reference now to FIG. 11, the outboard profile of the tip shroud 41 may have a scallop shape. Though other configurations are possible, the exemplary scallop shape is one that performs well in terms of reducing leakage while also minimizing weight. Whatever the profile, it will be appreciated that the regions or portions that make up the tip shroud 41 may be described given their position relative to the seal rail 42 and/or the profile of the underlying airfoil 25. Thus, as used herein, an airfoil portion 65 of the tip shroud 41 is the portion defined within a profile of the airfoil 25 projected radially through the tip shroud 41. A pressure portion 66 of the tip shroud 41 is the portion that cantilevers from and overhangs the pressure face 26 of the airfoil 25, while a suction portion 67 of the tip shroud 41 is the portion that cantilevers from and overhangs the suction face 27 of the airfoil 25. Finally, a leading portion 68 of the tip shroud 41 is the portion that extends in a forward direction from the seal rail 42 so to overhang the leading edge 28 of the airfoil 25, while a trailing portion 69 of the tip shroud 41 is the portion that extends in an aftward direction from the seal rail 42 so to overhang the trailing edge 29 of the airfoil 25.

With reference now to FIGS. 12 through 17, several internal cooling configurations are presented that are in accordance with aspects and exemplary embodiments of the present invention. As will be appreciated, these examples are described with reference to and in light of the systems and related concepts already provided herein, particularly those discussed in relation to the preceding figures.

The present invention may include an interior cooling configuration within airfoils and tip shrouds of gas turbine rotor blades. Such cooling configurations may include internal cooling channels for receiving and directing a coolant through the interior of the rotor blade. According to such cooling configurations, the cooling channels of the present invention may include fluidly connected sections or segments, which may include: a supply segment 72 that extends radially through the airfoil 25; a plenum segment or cutter tooth segment 73 that is formed within the seal rail 42 or, more particularly, the cutter tooth 43 of the seal rail 42; and branching segments 74 that extend from the cutter tooth segment 73. As will be discussed, the branching segments 74 may be formed within the tip shroud 41, the seal rail 42, and, more generally, an outboard region of the airfoil 25 (i.e., the portion of the airfoil 25 near or abutting the tip shroud 41). As illustrated, the branching segments 74 may extend between an upstream port, which connects to the cutter tooth segment 73, and a downstream port, which, because it is formed on a target surface area on an exterior surface of the rotor blade 16, will be referred to herein as an outlet port 75. Further, as will be discussed, the branching segments 74 may be configured to extend through or bisect a target interior region of the rotor blade 16.

According to present configurations, the supply segment 72, as illustrated, may include an upstream end formed through the root 21 of the rotor blade 16, which may connect the supply segment 72 to a coolant source. At a downstream end, the supply segment 72 may fluidly connect to the cutter tooth segment 73. According to exemplary configurations, the supply segment 72 may be configured as a radially oriented linear passageway through the airfoil 25.

The plenum segment or cutter tooth segment 73 may be configured as a manifold or plenum through which the supply of air that is delivered thereto is distributed to the several branching segments 74. Accordingly, a cross-sectional flow area of the cutter tooth segment 73 may be greater than the cross-sectional flow area of each of the branching segments 74 that branch therefrom. According to exemplary arrangements, the cross-sectional flow area of the cutter tooth segment 73 also may be greater than a cross-sectional flow area of the supply segment 72 that connects thereto. The cutter tooth segment 73 may be wholly contained with the cutter tooth 43. Alternatively, the cutter tooth segment 73 may substantially overlap with an interior region defined within the cutter tooth 43. In further embodiments, the cutter tooth segment 73 is formed within the seal rail 42 and/or the tip shroud 41.

The branching segments 74 may extend from the cutter tooth segment 73 along various pathways so to intersect the target surface areas and interior regions according to a desired cooling strategy for the airfoil 25 and/or the tip shroud 41. As will be understood, the cross-sectional flow areas of the branching segments 74 may be sized according to the desired metering of coolant flow to the target surface areas and through the target interior regions. The branching segments 74 may connect to the outlet ports 75, which, because the outlet ports 75 are formed on an outer surface of the rotor blade 16, results in the cooling configuration 36 of the present invention fluidly communicating with the working fluid flowpath through the turbine 12.

The outlet ports 75 of the branching segments 74 may be formed on predetermined target surface areas. These target surface areas, in general, may include several of the surface areas of the airfoil 25 and/or tip shroud 41 that have already been discussed herein. In accordance with exemplary embodiments, the target surface areas for the cooling configuration 36 may include one or more of the following: the pressure face 26 of the airfoil 25; the suction face 27 of the airfoil 25; the surface area corresponding to the inboard fillet region 49; the surface area corresponding to the outboard fillet region 48; the inboard surface 45 of the tip shroud 41; the edge 46 of the tip shroud 41; the rotationally leading edge 62 of the seal rail 42; the rotationally trailing edge 63 of the seal rail 42; the forward face 56 of the seal rail 42; and the aftward face 57 of the seal rail 42. In accordance with the present invention, the target interior regions for the present cooling configurations 36 may include one or more of the following: the outboard region of the airfoil 25 near or abutting the tip shroud 41; the inboard fillet region 49; the outboard fillet region 48; the leading portion 68 of the tip shroud 41; the trailing portion 69 of the tip shroud 41; the pressure portion 66 of the tip shroud 41; the suction portion 67 of the tip shroud 41; the airfoil portion 65 of the tip shroud 41; and the seal rail 42.

According to certain preferred embodiments, the cooling configurations 36 of the present invention include branching segments 74 that extend circumferentially so that they extend through the seal rail 42 from a coolant plenum formed within the seal rail 42 (i.e., the cutter tooth segment 73). Given this configuration, the coolant expended in this manner cools areas and regions within the tip shroud 41 and/or airfoil 25 that are particularly difficult to cool, yet needful of it. These regions may include the contact edges that form the contact interface between neighboring tip shrouds 41 as well as the edges of the seal rail 42. Thus, generally, the branching segments 74 may extend through the interior of the seal rail 42 toward the rotationally leading portions and/or the rotationally trailing portions of the tip shroud 41 and/or outboard regions of the airfoil 25. According to exemplary embodiments, as illustrated, the branching passages 74 may extend from the coolant plenum or cutter tooth segment 73 to outlet ports 75 formed on the rotational leading edge 62 and/or the rotational trailing edge 63 of the seal rail 42. According to other embodiments, these branching passages 74 may be angled inboard so to connect to outlet ports 75 formed on the rotationally leading or rotationally trailing edges 46 of the tip shroud 41, which may include the rotationally leading and trailing contact edges 52, 53 that make up the contact interface. Such inboard canted branching segments 41 may be configured to extend further inboard so to have outlet ports 75 formed through inboard surface 45 of the tip shroud 41, the inboard fillet region 49, and/or the outer surfaces of the airfoil 25. Accordingly, pursuant to certain preferred embodiments, the branching segments 74 that are angled inboard may be configured to extend through the inboard fillet region 49, which may include the pressure inboard fillet region, the suction inboard fillet region, or both. In such cases, the outlet ports 75 may be positioned on the pressure face 26 and/or suction face 27 of the airfoil 25.

Figure 12:
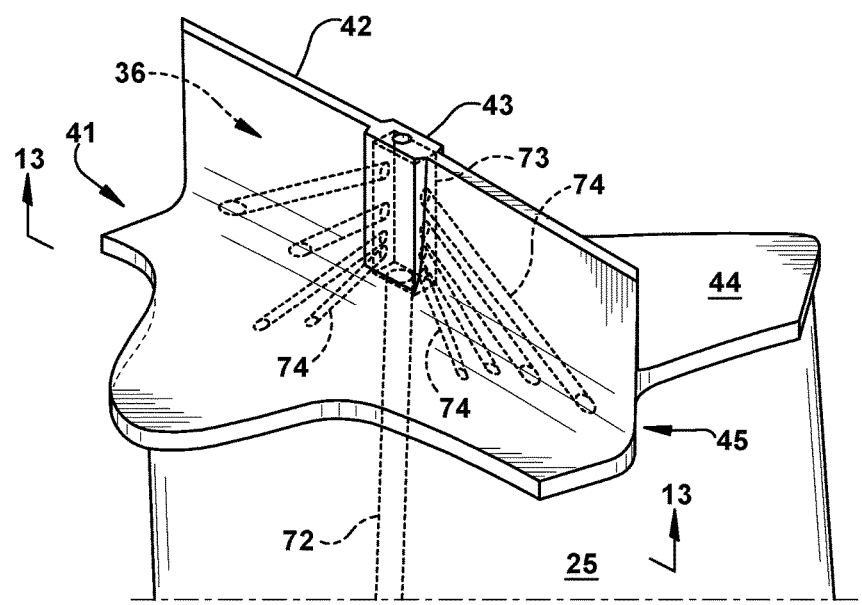
FIG. 12 is a perspective view of a tip shroud that includes an internal cooling configuration according to aspects and embodiments of the present application.
Figure 13:
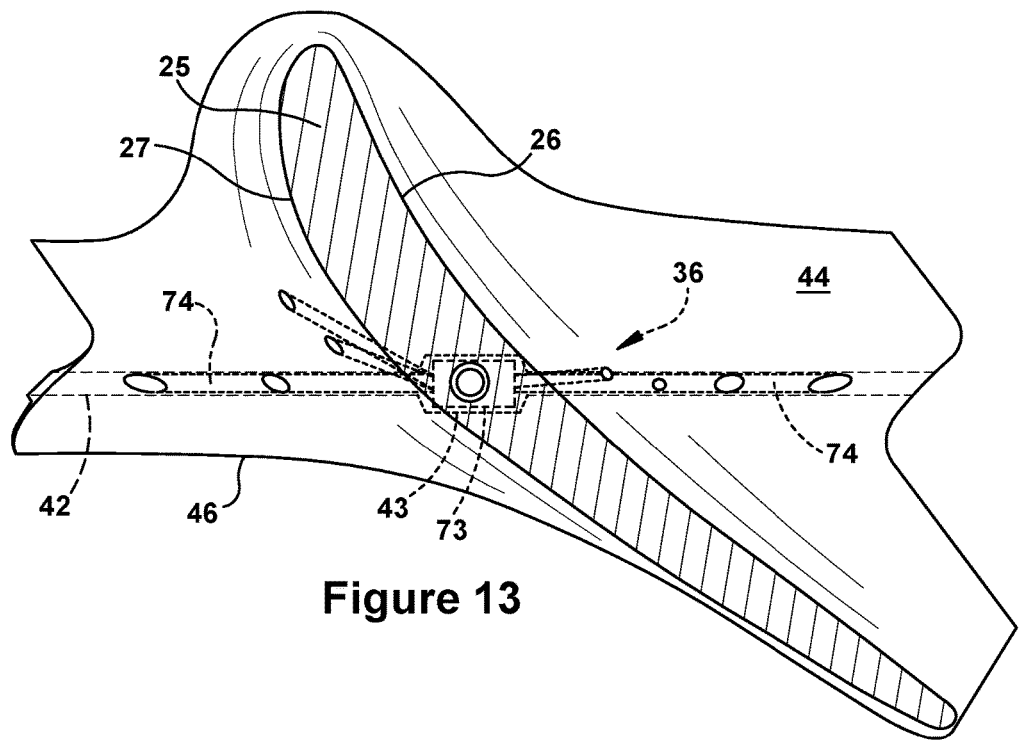
FIG. 13 is an inboard view of the tip shroud of FIG. 12.
Figure 14:
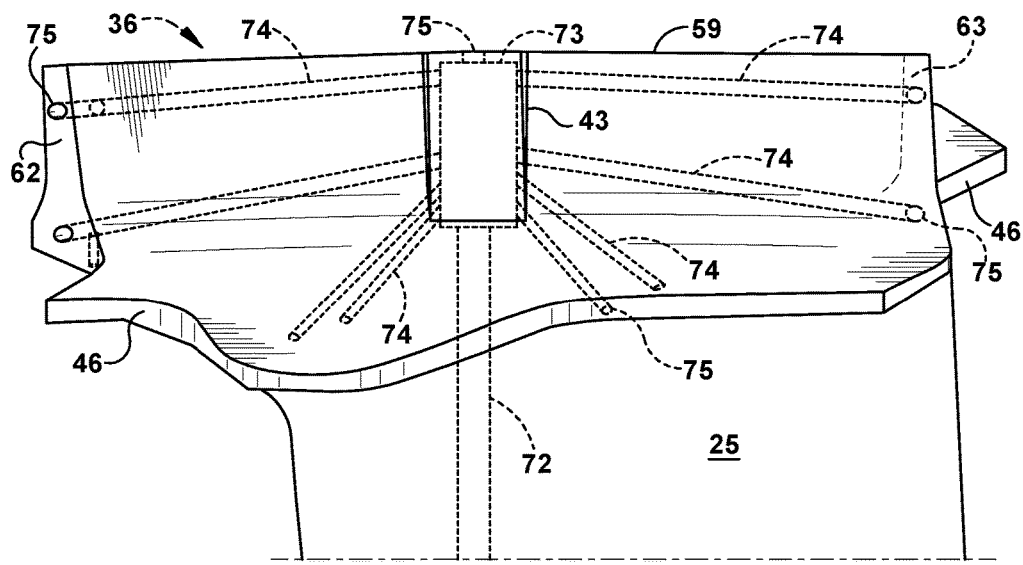
FIG. 14 is a perspective view of a tip shroud that includes an alternative internal cooling configuration according to aspects and embodiments of the present application.
Figure 15:
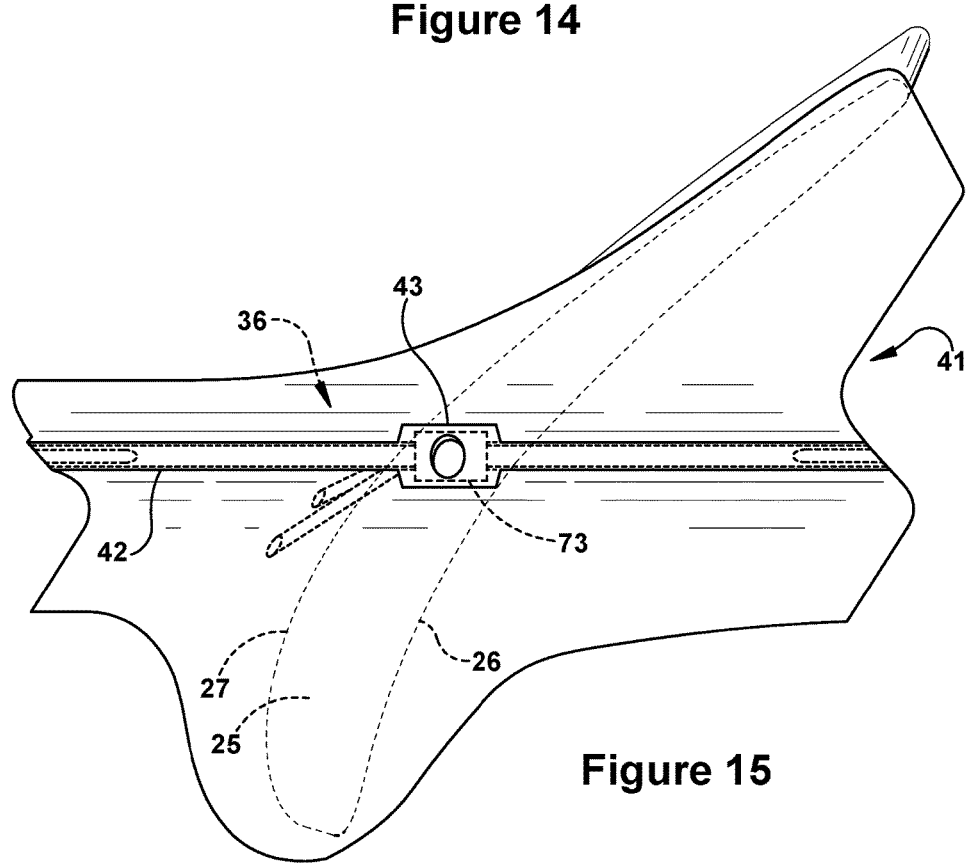
FIG. 15 is an outboard view the tip shroud of FIG. 14.

As illustrated in FIGS. 12 and 13, the branching segments 74 may include multiple ones that extend circumferentially such that at least one of the branching segments 74 extends through the seal rail 42 in the rotation direction and at least one extends through the seal rail 42 away from the rotation direction. As will be appreciated, oriented in this way, the branching segments 74 may be parallel to the longitudinal axis of the seal rail 42. As shown, the circumferentially extending branching segments 74 may be angled or canted in the inboard direction. The target surface areas of the circumferentially extending branching segments 74 may include the inboard surface 45 of the tip shroud 41. Alternately, the target surface areas of the circumferentially extending branching segments 74 may include the surface areas related to the inboard fillet region 49, which may include the pressure inboard fillet region, the suction inboard fillet region, or both. As illustrated in FIGS. 13 through 15, the circumferentially extending branching segments 74 may extend to outlet ports 75 formed on target surface areas that include one or both of the rotationally leading edge 62 and the rotationally trailing edge 63 of the seal rail 42. Outlet ports 75 formed on the forward and aftward faces 56, 57 are also possible.

Figure 16:
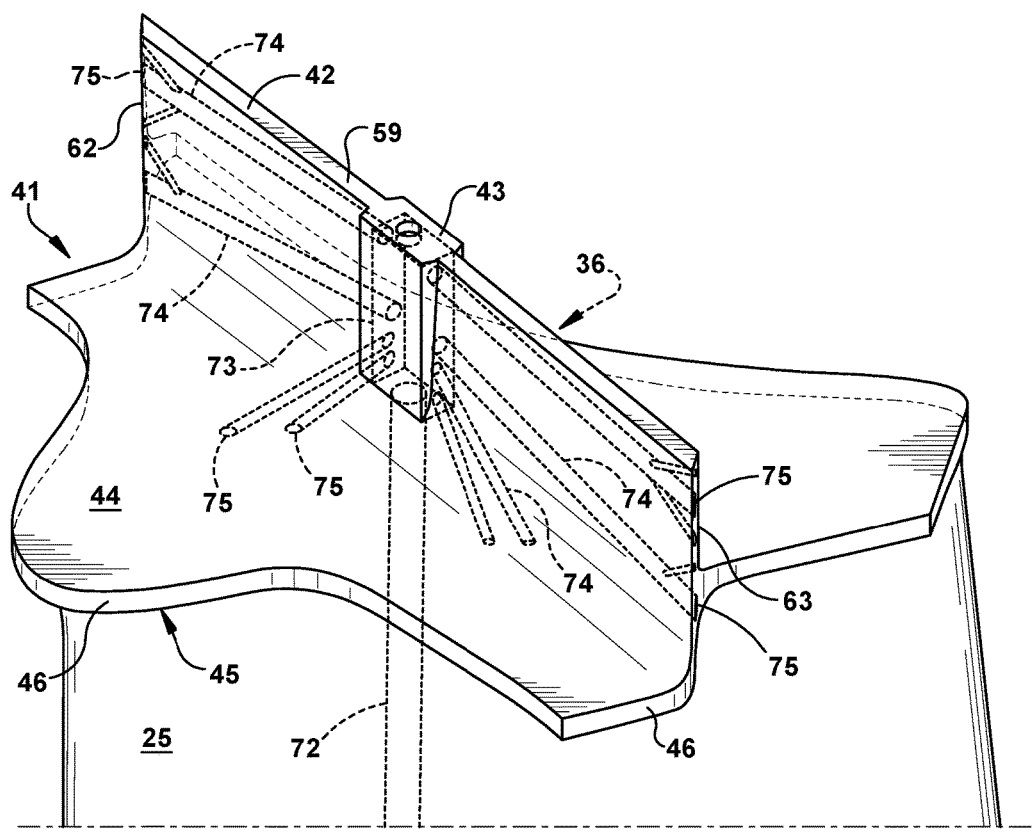
FIG. 16 is a perspective view of a tip shroud that includes an alternative internal cooling configuration according to aspects and embodiments of the present application.
Figure 17:
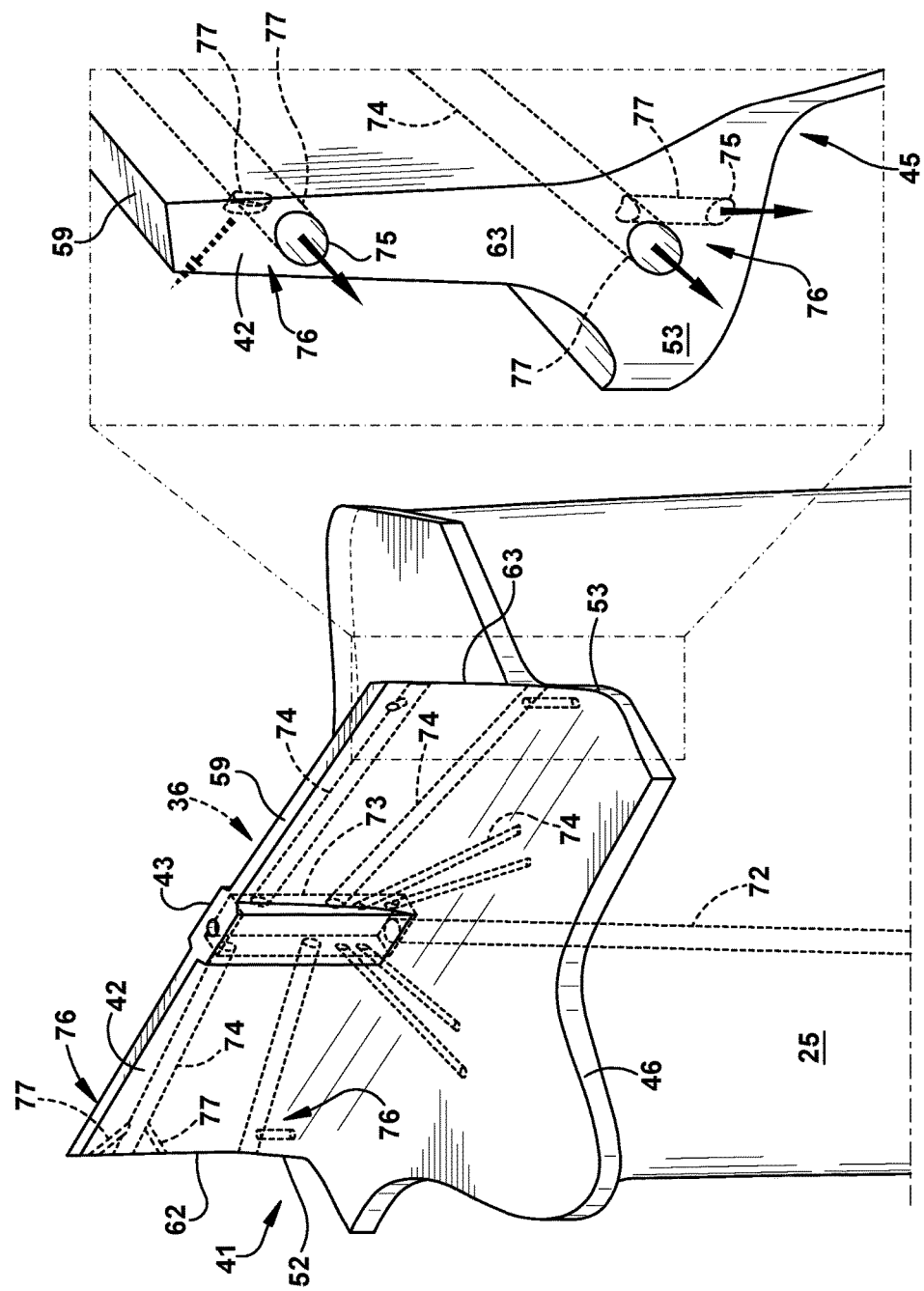
FIG. 17 provides another view of the tip shroud of FIG. 16 that includes enhanced component detail.

According to alternate embodiments, as illustrated in FIGS. 16 and 17, the branching segments 74 may have an outlet port 75 that is configured as a near-surface fork 76. As used herein, a near-surface fork 76 includes a splitting or forking of a branching segment 74 coolant passageway just before reaching the outer surface of the rotor blade. The near-surface fork 76 may split into two or more of the coolant passageways. Each of these passageways, which will be referred to herein as tines 77, may extend from the split to separate and discrete outlet ports 75, which may be employed to affect a larger surface area and internal region with the coolant of the coolant passageway than would otherwise be possible if the passageway had only a single outlet port 75. In this manner the coolant moving through the branching segments 74 may be spread over and through a larger surface area and a larger near-surface internal region before being released into the flow of working fluid. Because such near-surface internal regions represent highly effective regions through which to circulate coolant, the near-surface fork 76 may improves performance and cooling efficiency.

As mentioned, the near-surface fork 76 also allows the release of coolant over a larger external surface. This larger area may be solely contained within any one of the target surface areas already discussed herein or, alternatively, the near-surface fork 76 may be configured to included outlet ports 75 that cover or span across several of the target areas. Thus, for example, according to exemplary configurations, the near-surface fork 76 may include tines 77 connecting to two or more outlets formed entirely on either the rotationally leading edge 62 of the seal rail 42 or the rotationally trailing edge 63 of the seal rail 42. That is to say, the near-surface fork 76 may include a first tine 77 and second tine 77 that connect to outlet ports 75 that are both formed on the rotationally leading edge 62 and/or both formed on the rotationally trailing edge 63 of the seal rail 42. According to the alternative type of configuration, the near-surface fork 76, for example, may include a first tine 77 connected to an outlet port 75 formed on the edge 46 of the tip shroud 41 and a second tine 77 that connects to an outlet port 75 formed on the inboard surface 45 of the tip shroud 41. Pursuant to another example, for example, the near-surface fork 76 may include a first tine 77 that connects to an outlet port 75 formed on either the rotationally leading edge 62 or the rotationally trailing edge 63 of the seal rail 42, and a second tine 77 that connects to an outlet port 75 formed on either the forward face 56 or the aftward face 57 of the seal rail 42. Other configurations, some of which are illustrated, are also possible.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for a turbine of a gas turbine that includes:
an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc;
a tip shroud connected to the outboard tip of the airfoil, the tip shroud comprising a seal rail projecting from an outboard surface and, formed on the seal rail, a cutter tooth;
a cooling configuration that includes a cooling channel for receiving and directing a coolant through an interior of the rotor blade, the cooling channel comprising fluidly connected segments, in which:
a supply segment extends radially through the airfoil;
a plenum segment is formed within the seal rail; and
branching segments are formed within at least one of the tip shroud and an outboard region of the airfoil;
wherein each of the branching segments extends between an upstream port, which connects to the cutter tooth segment, and an outlet port, which is formed on a target surface area, and, therebetween, bisects a target interior region;
wherein:
the plenum segment comprises a cutter tooth segment formed within the cutter tooth of the seal rail;

the tip shroud comprises an axially and circumferentially extending component supported by the outboard tip of the airfoil;

the tip shroud comprises an inboard surface in opposition to the outboard surface across a radial thickness of the tip shroud, and, connecting the inboard surface to the outboard surface, an edge that defines an outboard profile of the tip shroud;

the seal rail projects radially outward from the outboard surface of the tip shroud and extends circumferentially in a rotation direction of the rotor blade; and the cutter tooth comprises circumferential section of the seal rail that is axially widened between the outboard surface of the tip shroud and an outboard edge of the seal rail;

wherein: the rotor blade comprises: an inboard fillet region configured to smoothly transition between the airfoil and the inboard surface of the tip shroud; and an outboard fillet region configured to smoothly transition between: the outboard surface of the tip shroud and a forward face of the seal rail; and the outboard surface of the tip shroud and an aftward face of the seal rail;

wherein the tip shroud comprises: a leading portion that overhangs the leading edge of the airfoil; a trailing portion that overhangs the trailing edge of the airfoil; a pressure portion that overhangs the pressure face of the airfoil; a suction portion that overhangs the suction face of the airfoil; and an airfoil portion that is defined within an outline of a profile of the airfoil;

wherein the seal rail comprises opposing rail faces, in which the forward face and the aftward face of the seal rail correspond to the forward direction and aftward direction of the turbine, respectively;

wherein the seal rail comprises a rectangular profile such that the forward face and the aftward face of the seal rail connect along edges that include: opposing outboard and inboard edges; and rotationally leading and rotationally trailing edges in which the rotationally leading edge leads the rotationally trailing edge relative the rotation direction of the rotor blade;

wherein the target surface areas include at least two of: the pressure face of the airfoil; the suction face of the airfoil; surface area corresponding to the inboard fillet region; surface area corresponding to the outboard fillet region; the inboard surface of the tip shroud; the edge of the tip shroud; the rotationally leading edge of the seal rail; the rotationally trailing edge of the seal rail; the forward face of the seal rail; and the aftward face of the seal rail; and wherein the target interior regions comprise at least two of: the outboard region of the airfoil; the inboard fillet region; the outboard fillet region; the leading portion of the tip shroud; the trailing portion of the tip shroud; the pressure portion of the tip shroud; the suction portion of the tip shroud; the airfoil portion of the tip shroud; and the seal rail;

wherein the branching segments include multiple branching segments extending circumferentially such that at least one extends toward the rotation direction and one extends away from the rotation direction;

wherein at least one of the multiple circumferentially extending branching segments includes the outlet port configured to include a near-surface fork, the near-surface fork including tines that connect to corresponding ones of the outlet ports formed on at least two of the target surface areas.

2. The rotor blade according to claim 1, wherein:
the cutter tooth segment comprises:
a plenum wholly contained with the cutter tooth;
a position in a circumferential middle region of the seal rail;
a cross-sectional flow area that is greater than a cross-sectional flow area of each of the branching segments that branch therefrom; and
a cross-sectional flow area that is greater than a cross-sectional flow area of the supply segment that connects thereto; and
the supply segment comprises:
an upstream end formed through the root of the rotor blade, at which the supply segment fluidly connects to an air source, and a downstream end that fluidly connects to the cutter tooth segment;
a radially oriented linear passageway through the airfoil; and
the branching segments comprises outlet ports.

3. The rotor blade according to claim 1, wherein cross-sectional flow areas of the branching segments are sized according to a desired metering of coolant flow through the target interior regions; and
wherein:
a pressure inboard fillet region comprises the inboard fillet region between the pressure face of the airfoil and the inboard surface of the tip shroud;
a suction inboard fillet region comprises the inboard fillet region between the suction face of the airfoil and the inboard surface of the tip shroud;
a forward outboard fillet region comprises the outboard fillet region between the forward face of the seal rail and the outboard surface of the tip shroud; and
an aftward outboard fillet region comprises the outboard fillet region between the aftward face of the seal rail and the outboard surface of the tip shroud.

4. The rotor blade according to claim 1, wherein:
the outboard profile of the tip shroud comprises a notched section for engaging a tip shroud of a neighboring rotor blade upon installation in a row of samely-configured rotor blades; and
the seal rail extends across substantially an entire circumferential length of the outboard surface of the tip shroud, wherein the circumferential length of the tip shroud comprises a length of the tip shroud in the rotation direction.

5. The rotor blade according to claim 1, wherein the cutter tooth is disposed within the airfoil portion of the outboard surface of the tip shroud;
wherein the cutter tooth comprises a rectangular profile; and
wherein the cutter tooth comprises an enlarged volume corresponding to a cross-sectional flow area of the cutter tooth segment of the cooling channel.

6. The rotor blade according to claim 1, wherein the multiple circumferentially extending branching segments each comprise an inboard cant; and
wherein the target surface areas of the multiple circumferentially extending branching segments comprise the inboard surface of the platform.

7. The rotor blade according to claim 1, wherein the target surface areas of the multiple circumferentially extending branching segments comprise surface areas related to the inboard fillet region.

8. The rotor blade according to claim 1, wherein the target surface areas of the multiple circumferentially extending branching segments comprise surface areas related to both the pressure inboard fillet region and the suction inboard fillet region.

9. The rotor blade according to claim 1, wherein the target interior regions of the multiple circumferentially extending branching segments comprise both the pressure inboard fillet region and the suction inboard fillet region.

10. The rotor blade according to claim 1, wherein the target surface areas of the multiple circumferentially extending branching segments comprise both the rotationally leading edge and the rotationally trailing edge of the seal rail.

11. The rotor blade according to claim 1,
wherein one of the tines of the near-surface fork connects to a one of the outlet ports formed on one of: the rotationally leading edge of the seal rail; and the rotationally trailing edge of the seal rail.

12. The rotor blade according to claim 1, wherein:
a first tine of the near-surface fork connects to a one of the outlets formed on the edge of the tip shroud; and
a second tine of the near-surface fork connects to a one of the outlets formed on the inboard surface of the tip shroud.

13. The rotor blade according to claim 1, wherein:
a first tine of the near-surface fork connects to a one of the outlets formed on one of the rotationally leading edge and the rotationally trailing edge of the seal rail; and
a second tine of the near-surface fork connects to a one of the outlets formed on one of the forward face and the aftward face of the seal rail.

* * * * *